United States Patent Office 3,716,937
Patented Feb. 20, 1973

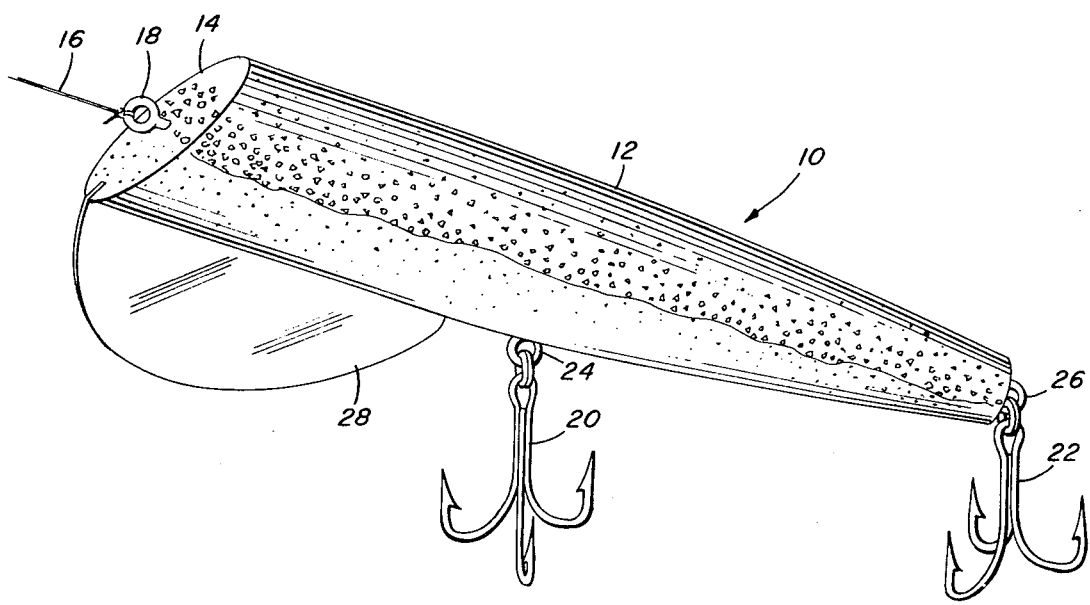

3,716,937
FISHING LURE
Robert C. Santosuosso, 42 Sterling St.,
Malden, Mass. 02148
Filed July 26, 1971, Ser. No. 166,028
Int. Cl. A01k 85/00
U.S. Cl. 43—42.47                                    1 Claim

ABSTRACT OF THE DISCLOSURE

A high action fishing plug is disclosed for use in both casting and trolling. The lure is comprised of a continuously tapered body portion of a light-weight wood or the like adapted to float when idle. The body portion is formed with a forward face rearwardly beveled upwardly from the lower forward end of the plug to produce a diving action when the plug is pulled through water. Relatively heavy hooks are positioned to keep the plug upright and a downwardly and rearwardly extending vertical transparent vane extends from the forward end of the plug along the lower leading end of the plug to introduce a transverse wiggling motion. The exposed edge of the vane forms an arc from front to rear.

BACKGROUND OF THE INVENTION

(1) Field of the invention

This invention relates generally to fishing lures and more particularly is directed towards an improved, high action plug of simple rugged construction and adapted to simulate the motion and appearance of a live fish when pulled through the water.

(2) Description of the prior art

Fishing plugs and lures are available in a wide variety of designs and configurations calculated to attract one or more types of fish. Many such lures are double or tripled jointed, tend to be ornate and do not always achieve the desired effect. Accordingly, it is an object of the present invention to provide a simple, rugged fishing lure of improved construction and design and displaying a life-like motion as well as appearance when pulled through the water.

SUMMARY OF THE INVENTION

This invention features a high-action fishing lure, comprising a lure body of unitary construction formed of a material lighter than water so as to float when at rest. The body of the lure is of tapered, elongated construction formed with a beveled forward face causing the lure to dive when pulled forwardly through the water. Hooks are located preferably in the mid-portion and tail portion thereof providing sufficient counterbalancing weight to maintain the lure in a normal upright position. A transparent vane is mounted to the lower forward portion of the lure body to produce a wiggling motion of the lure when pulled through the water.

BRIEF DESCRIPTION OF THE DRAWING

The drawing is a view in perspective of a fishing lure made according to the invention.

DETAILED DESCRIPTION OF THE PREFERRED EMBODIMENT

In the drawings, the reference character 10 generally indicates a fishing lure which is particularly effective in attracting and catching salt water striped bass. The lure is comprised of a body portion 12, typically about six inches in length and preferably formed of a light-weight material permitting the lure to float on the surface of the water when at rest. For this purpose, basewood has been found to be particularly effective since it is a light-weight, non-porous wood of high strength. Redwood also has been found to be satisfactory for this purpose.

The lure body 12 preferably is circular in cross section having an elongated tapered configuration much like a bait fish such as a mackeral or herring, for example. Preferably, the upper half of the body 12 is painted or otherwise colored in a dark blue hue while the underside thereof is white simulating the colors of a real fish. The entire body portion preferably is covered with small reflective particles to further simulate the appearance of a natural fish.

The forward end of the lure body 12 is formed a beveled face 14 the lower portion of which leads the upper portion whereby, when the lure is pulled through the water by means of a line 16 connected to an eye 18 fastened centrally to the beveled face 14, the water pressure acting against the beveled face will cause the lure to dive into the water. In practice, the face 14 is painted or otherwise colored a bright red which has been found to be effective in attracting game fish.

Hooks 20 and 22, preferably three-prong hooks, are attached by eyes 24 and 26 to the lure body 12 at the lower mid-section thereof and at the tail portion thereof as shown. The hooks are free to swivel and normally are suspended in the manner shown to provide a counterbalancing weight to the lure to maintain it in an upright position whereby the beveled face will assume an attitude which will cause the lure to dive when pulled through the water.

Mounted in a slot along the lower forward portion of the lure body 12 is a vane 28, preferably of a transparent plastic such as acrylic or the like. The vane preferably is of thin, flat, sheet stock shaped in the semi-oval outline shown in the drawing and having a maximum width substantially equal to the widest diameter of the plug body 12 and extending from the forward end of the plug body to a point adjacent the hook 20. The function of the vane 28 is to impart a transverse wiggling motion to the lure when it is drawn through the water. Thus, when the lure is cast out onto the water, it will first float. When the lure is drawn in or trolled, it will first dive into the water and then develop a wiggling motion realistically depicting the action of a live fish. The vane 28, which is transparent, becomes virtually invisible when the plug is in the water. Thus, the lure presents an appearance closely matching that of bait fish and displays a live action found to be particularly effective in attracting the attention of fish particularly salt water striped bass.

Having thus described the invention what I claim and desire to obtain by Letters Patent of the United States is:

1. A fishing lure, comprising:
   (a) an elongated continuously tapered body formed of a floatable opaque material,
   (b) a flat transparent elongated vane extending vertically downwardly and longitudinally rearwardly along the lower forward portion of said body from the lower foreward end of said body rearwardly to the medial portion thereof, the exposed edge of said vane forming an arc form front to rear,
   (c) the forward end of said body being formed with a beveled face extending upwardly and rearwardly from the lower forward end of said body, and,
   (d) at least one hook mounted to the lower portion of said body rearwardly of said vane.
   (e) the maximum width of said vane being substantially equal to the maximum thickness of said body.

References Cited
UNITED STATES PATENTS

| 1,525,291 | 2/1925 | Green | 43—42.48 |
| 2,510,566 | 6/1950 | Flaherty | 43—42.33 X |
| 2,008,250 | 7/1935 | Haas | 43—42.47 X |
| 2,403,202 | 7/1946 | Woodward | 43—42.47 X |
| 1,639,863 | 8/1927 | Sinclair et al. | 43—42.32 UX |
| 2,283,960 | 5/1942 | Wade | 43—42.47 X |
| 2,611,207 | 9/1952 | Pond | 43—42.47 X |
| 3,401,483 | 9/1968 | Bellah et al. | 43—42.47 X |

OTHER REFERENCES

The Washington Post and Times Herald, "What . . . Deep," Apr. 30, 1959, p. A25.

LOUIS G. MANCENE, Primary Examiner

J. H. CZERWONKY, Assistant Examiner

U.S. Cl. X.R.

43—42.32, 43.13